United States Patent
Prechner et al.

(10) Patent No.: US 10,292,126 B2
(45) Date of Patent: *May 14, 2019

(54) LOCATION CONFIGURATION INFORMATION (LCI) QUERY

(71) Applicant: INTEL CORPORATION, Santa Clara, CA (US)

(72) Inventors: Gaby Prechner, Rishon Lezion (IL); Itai Steiner, Tel Aviv (IL); Shani Ben-Haim, Haifa (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/184,518

(22) Filed: Jun. 16, 2016

(65) Prior Publication Data

US 2017/0013588 A1  Jan. 12, 2017

Related U.S. Application Data

(63) Continuation of application No. 14/126,628, filed as application No. PCT/US2013/060951 on Sep. 20, 2013, now Pat. No. 9,386,472.

(51) Int. Cl.
*H04W 24/10* (2009.01)
*H04W 64/00* (2009.01)
*H04W 88/08* (2009.01)

(52) U.S. Cl.
CPC ......... *H04W 64/003* (2013.01); *H04W 24/10* (2013.01); *H04W 88/08* (2013.01)

(58) Field of Classification Search
CPC .... H04W 88/08; H04W 24/10; H04W 64/003
See application file for complete search history.

(56) References Cited

U.S. PATENT DOCUMENTS

| | | | |
|---|---|---|---|
| 9,386,472 | B2 | 7/2016 | Prechner et al. |
| 2006/0208888 | A1 | 9/2006 | Patel et al. |

(Continued)

FOREIGN PATENT DOCUMENTS

| | | |
|---|---|---|
| EP | 3145258 | 3/2017 |
| JP | 2007306454 | 11/2007 |

(Continued)

OTHER PUBLICATIONS

Office Action for Korean Patent Application No. 2016-7004155, dated Dec. 17, 2016, 12 pages.(Including 6 pages of English translation).

(Continued)

*Primary Examiner* — Jay P Patel
(74) *Attorney, Agent, or Firm* — Shichrur & Co.

(57) ABSTRACT

Embodiments for providing a query for location information for access points (APs) proximate to a reporting AP are generally described herein. A station may include a processor arranged to generate a Location Configuration Information (LCI) request having subelements arranged to query a reporting AP for a LCI report that includes location information regarding APs proximate to the reporting AP and a transceiver, coupled to the processor, the transceiver being arranged to send to the reporting AP the generated LCI request for the LCI report that includes location information regarding APs proximate to the reporting AP.

34 Claims, 7 Drawing Sheets

(56) References Cited

U.S. PATENT DOCUMENTS

| | | | |
|---|---|---|---|
| 2008/0259811 A1 | 10/2008 | Cordeiro et al. | |
| 2009/0093956 A1 | 4/2009 | Wu et al. | |
| 2009/0217333 A1 | 8/2009 | Young et al. | |
| 2010/0008337 A1 | 1/2010 | Bajko | |
| 2010/0067482 A1 | 3/2010 | Vikberg et al. | |
| 2010/0283679 A1 | 11/2010 | Levy et al. | |
| 2011/0269478 A1 | 11/2011 | Das et al. | |
| 2011/0299481 A1 | 12/2011 | Kim et al. | |
| 2011/0310816 A1 | 12/2011 | Kim et al. | |
| 2012/0058778 A1 | 3/2012 | Waters et al. | |
| 2012/0157121 A1 | 6/2012 | Li et al. | |
| 2012/0157123 A1 | 6/2012 | Li et al. | |
| 2012/0236826 A1 | 9/2012 | Roy et al. | |
| 2013/0101163 A1* | 4/2013 | Gupta | G06K 9/00671 382/103 |
| 2013/0165150 A1 | 6/2013 | Cho et al. | |
| 2013/0176897 A1 | 7/2013 | Wang et al. | |
| 2013/0267237 A1 | 10/2013 | Kim et al. | |
| 2013/0267242 A1 | 10/2013 | Curticapean et al. | |
| 2013/0310080 A1* | 11/2013 | Palanki | G01S 5/0236 455/456.3 |
| 2014/0003310 A1 | 1/2014 | Kamath et al. | |
| 2014/0003406 A1 | 1/2014 | Kamath et al. | |
| 2014/0016485 A1 | 1/2014 | Curticapean | |
| 2014/0077998 A1* | 3/2014 | Amizur | G01S 5/0236 342/386 |
| 2014/0153460 A1 | 6/2014 | Shrivastava et al. | |
| 2014/0179345 A1* | 6/2014 | Gunnarsson | H04W 4/02 455/456.1 |
| 2014/0192658 A1* | 7/2014 | Venkatraman | |
| 2014/0233443 A1 | 8/2014 | Kumar | |
| 2014/0241262 A1* | 8/2014 | Novak | H04W 72/042 370/329 |
| 2014/0248899 A1* | 9/2014 | Emadzadeh | G01S 5/0236 455/456.1 |
| 2014/0258395 A1* | 9/2014 | Tng | H04L 67/16 709/204 |
| 2014/0324381 A1* | 10/2014 | Venkatraman | G01C 21/00 702/138 |
| 2015/0024772 A1* | 1/2015 | Das | G01S 5/0284 455/456.1 |
| 2015/0049679 A1 | 2/2015 | Homchaudhuri et al. | |
| 2016/0174186 A1* | 6/2016 | Loureiro | H04W 4/02 455/456.1 |
| 2017/0079078 A1* | 3/2017 | Wang | H04W 76/021 |

FOREIGN PATENT DOCUMENTS

| | | |
|---|---|---|
| JP | 2009088995 | 4/2009 |
| JP | 2009539296 | 11/2009 |
| JP | 2010507963 | 3/2010 |
| JP | 2012520610 | 9/2012 |
| JP | 2013529432 | 7/2013 |
| JP | 2016533668 | 10/2016 |
| JP | 201741905 | 2/2017 |
| KR | 20110028544 | 3/2011 |
| WO | 2011067824 | 6/2011 |

OTHER PUBLICATIONS

International Preliminary Report on Patentability for PCT/US2013/060951, dated Mar. 31, 2016, 7 pages.

Ecclesine, et al., "Location Configuration Information", IEEE 802.11-05/0072r0, Jan. 18, 2005, 8 pages.

International Search Report and Written Opinion for International Patent Application No. PCT/US2013/060951, dated Jun. 26, 2014, 10 pages.

Office Action for U.S. Appl. No. 14/126,628, dated Dec. 3, 2015, 10 pages.

Office Action for U.S. Appl. No. 14/126,628, dated Jul. 16, 2015, 14 pages.

Notice of Allowance for U.S. Appl. No. 14/126,628, dated May 23, 2016, 8 pages.

Office Action for Korean Patent Application No. 2016-7028394, dated Jan. 12, 2017, 10 pages (Including 5 pages of English translation).

Office Action for Japanese Patent Application No. 2016-540864, dated Jan. 31, 2017, 7 pages (Including 3 pages of English translation).

Office Action for European Patent Application No. 16191859.4, dated Feb. 9, 2017, 4 pages.

European Search Report for European Patent Application No. 16191859.4, dated May 22, 2017, 17 pages.

European Search Report for European Patent Application No. 13893773.5, dated May 22, 2017, 12 pages.

"Information technology—Telecommunications and information exchange between systems Local and metropolitan area networks—Specific requirements Part 11: Wireless LAN Medium Access Control (MAC) and Physical Layer (PHY) Specifications; ISO/IEC/IEEE 8802-11:2012(E) (Revison of ISO/IEC/IEEE 8802-11-2005)", IEEE Standard, IEEE, Piscataway, NJ, USA, Nov. 22, 2012, pp. 1-2798, 2798 pages.

Office Action for Korean Patent Application No. 2016-7028394, dated Aug. 2, 2017, 9 pages (Including 4 pages of English translation).

Office Action for Japanese Patent Application No. 2016-201621, dated Oct. 3, 2017, 4 pages (Including 2 pages of English translation).

Office Action for Chinese Patent Application No. 201380078993.8, dated May 18, 2018, 7 pages.

Office Action for European Patent Application Number 13893773.5, dated Aug. 29, 2018, 7 pages.

\* cited by examiner

LOCATION CONFIGURATION INFORMATION (LCI) QUERY

BACKGROUND

Recently the wireless industry has had an increasing interest on Machine to Machine (M2M) communications or Machine Type Communications (MTC) linked to technologies like Smart Grid, Wireless Sensor Networks, and applications focused on maximizing the control of resources and the tracking of vehicles and goods. M2M uses a device (sensor, meter, etc.) to capture an 'event' (temperature, inventory level, etc.), which is relayed through a network (wireless, wired or hybrid) to an application (software program), that translates the captured event into meaningful information (e.g., items need to be restocked). MTC relies on devices interacting to produce data with little, if any, human assistance, but that data has to be available for use by humans. User interfaces and mechanisms allow an easy query, or in general terms, an intuitive experience and interaction. Today's communication networks, e.g., mobile operator networks, have been designed and built to fit the needs of human communication. At the same time machine-to-machine (M2M) communication solutions have emerged that are available on the market today. However, such solutions are mostly monolithic infrastructures that do not interoperate.

Related to MTC is the Internet of Things (IoT), which is a computing concept where physical objects may be connected to the Internet and identify themselves to other devices. IoT services rely on the locating and tracking of connected objects. IoT refers to identifiable objects and their virtual representations in an Internet-like structure. Radio-frequency identification (RFID) is often seen as a prerequisite for the IoT to allow management and inventorying of devices by computers. Radio frequency systems employ a transmitted signal that is received by some mobile devices within the network. The RF is used in several estimation techniques such as the received signal strength intensity, angle of arrival, time of flight (ToF) and after it is employed by triangulation to calculate the node's position An Access Point (AP) may periodically provide location reports to stations, which have currently connectivity with this AP. Components that connect into a wireless medium in a network are referred to as stations. Stations are equipped with wireless network interface controllers (WNICs). Wireless stations fall into one of two categories: access points, and clients. Access points (APs), normally routers, are base stations for the wireless network. They transmit and receive radio frequencies for wireless enabled devices to communicate with. Wireless clients can be mobile devices such as laptops, personal digital assistants, IP phones and other smartphones, or fixed devices such as desktops and workstations that are equipped with a wireless network interface.

A reporting AP delivers the information as part of the Location Configuration Information Report. A Location Configuration information report includes location information for the reporting AP, e.g., latitude, longitude and altitude information. For ToF location, an initiator, e.g., a station, needs to know the location of each responding unassociated AP to become self-aware of its location after calculating the range of a responding AP. The IEEE 802.11 standard provides a way to query the AP that the station is associated with for the AP's location. However, there is no way to query an AP for the locations of other APs. Further, the number of times the protocol is performed to obtain unassociated AP locations is currently too great.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Embodiments described herein provide for AP location queries for access points (APs) proximate to a reporting AP in order for a station to determine its location. For example, APs may be arranged in a cluster of APs in which some are further than others from the reporting AP, AP may be proximate to a reporting AP, etc. The 802.11k standard provides a protocol for a Location Configuration information Request (LCI Request) that enables a station to obtain the location of a reporting AP. The reporting AP may be the associated AP, and in that case, the frame exchange may also be secured, using Protected Management Frame facilities. Other 802.11 standards, e.g., the 802.11v standard, the 802.11u standard, etc. use similar LCI messages. According to an embodiment, the location of APs other than the reporting AP may be provided through enhancements and extensions of the 802.11k protocol. APs may be identified with their basic service set identifier (BSSID). A BSSID is the MAC address of the wireless interface or subinterface on which access points host an SSID. Access points include the BSSID in their beacons and probe responses.

The reporting AP delivers the information as part of the Location Configuration Information Report. A Location Configuration information report includes location information for the reporting AP, e.g., latitude, longitude and altitude information. The enhancements and extension of the 802.11k protocol may provide power and time savings and enable a secure medium for location report.

Figure 1:
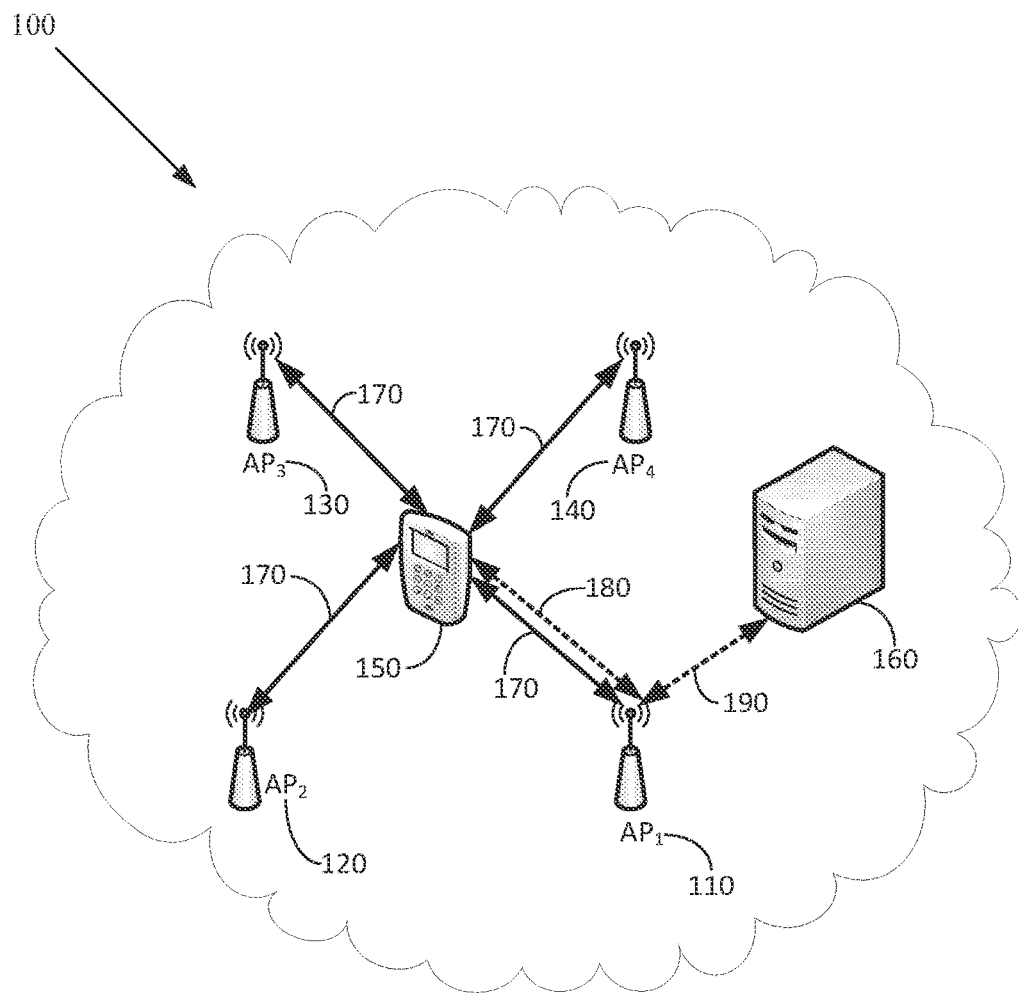
FIG. 1 illustrates AP location queries according to an embodiment.

FIG. 1 illustrates AP location queries 100 according to an embodiment. In FIG. 1, four APs: AP$_1$ 110, AP$_2$ 120, AP$_3$ 130, AP$_4$ 140 are shown in a network. A client 150, e.g., a UE, mobile phone, etc., is in communication with the four APs: AP$_1$ 110, AP$_2$ 120, AP$_3$ 130, AP$_4$ 140. A network management/gateway 160 manages the APs: AP$_1$ 110, AP$_2$ 120, AP$_3$ 130, AP$_4$ 140, and network users, e.g., client 150, inside the controlled network.

Fine Timing Measurement frames 170 allow a receiving station to accurately measure the Round Trip Time (RTT) relative to a sending station. With the regular transfer of Fine Timing Measurement frames 170 from one station to another, it is possible for the recipient station to track changes in the RTT with respect to the sending station over time. In FIG. 1, a client may receive fine timing measurement frames 170 from the four APs: $AP_1$ 110, $AP_2$ 120, $AP_3$ 130, $AP_4$ 140. In FIG. 1, $AP_1$ 110 is an associated AP and will handle location requests form the client station 110 for locations of the proximate APs: $AP_2$ 120, $AP_3$ 130, $AP_4$ 140. A location request 180 is sent from the client to the associated AP, $AP_1$ 110. The associated AP, $AP_1$ 110, may not know the location of its neighbors. Thus, the network management/gateway 160 may be queried to obtain location information 190 for proximate APs: $AP_2$ 120, $AP_3$ 130, $AP_4$ 140. The associated AP, $AP_1$ 110, may then transmit a location report 180 to the client 150 providing the location of the serving AP, $AP_1$, as well as the location of the neighboring APs, $AP_2$ 120, $AP_3$ 130, $AP_4$ 140.

Figure 2:
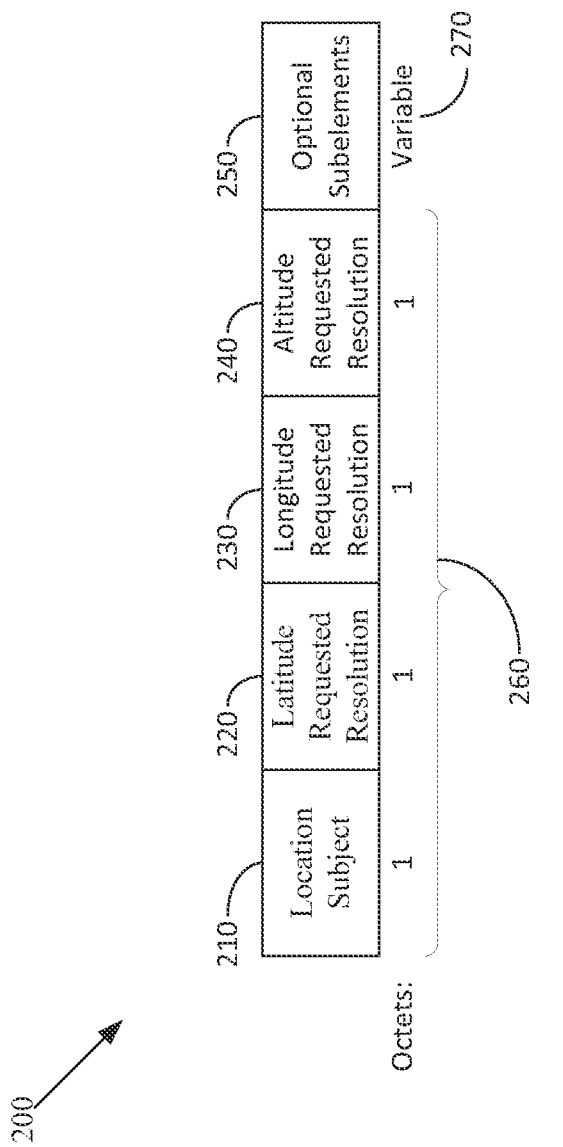
FIG. 2 illustrates a LCI request according to the IEEE 802.11k standard.

FIG. 2 illustrates a LCI request 200 according to the IEEE 802.11k standard. The LCI Request 200 is enhanced to enable a station to indicate it would like to receive an enhanced LCI report including proximate APs and extended information. In FIG. 2, the LCI request 200 includes a Location Subject field 210, a Latitude Requested Resolution field 220, a Longitude Requested Resolution field 230, an Altitude Requested Resolution field 240 and Optional Sub-Elements field 250. The LCI request includes 4 octets 260 for the Location Subject field 210, Latitude Requested Resolution field 220, Longitude Requested Resolution field 230, and Altitude Requested Resolution field 240. The octets used for the optional sub-elements are variable 270. According to an embodiment, the Optional Sub-Elements field 250 may be used to query other APs proximate to the associated AP.

Figure 3:
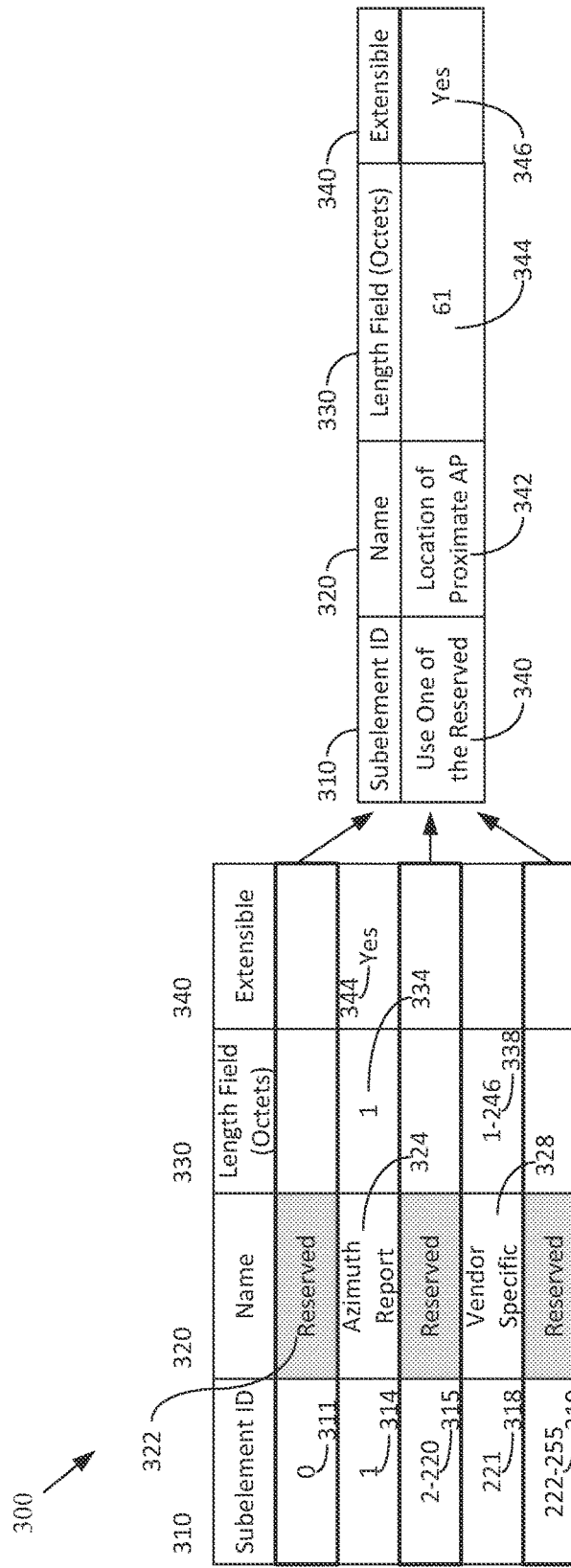
FIG. 3 illustrates the optional sub-elements field according to an embodiment.

FIG. 3 illustrates the optional sub-elements field 300 according to an embodiment. The optional sub-elements field 300 may be used to issue a query for proximate APs other than the AP reporting to the station. In FIG. 3, the optional sub-elements field 300 includes a Subelement ID 310, a Name field 320, a Length field in octets 330 and an Extensible field 340.

The optional sub-elements field 300 is reserved 322 when the Subelement ID 310 has a value 311 of 0, when the Subelement identifier (ID) 310 has a value 315 in the range of 2-220, and when the Subelement ID 310 has a value 319 in the range of 222-255. When the Subelement ID 310 has a value 314 of 1, the optional sub-elements field 300 is used for an Azimuth Request 324, which has a value 334 in the Length field (in octets) 330 of 1, and the Extensible field 340 is Yes 344. A Yes 344 in the Extensible field 340 indicates that the length indicated in the Length field 330 of the subelement may be extended. When the Subelement ID 310 has a value 318 of 221, the optional sub-elements field 300 is used for a Vendor Specific query 328, which has a value 338 in the Length field (in octets) 330 of 1-246.

Figure 4:
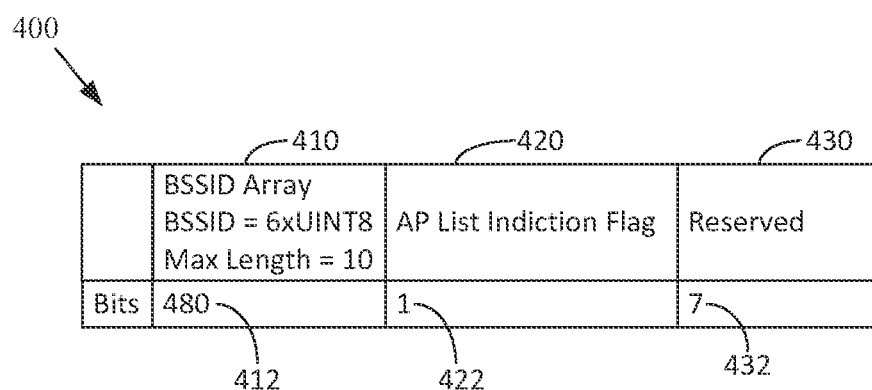
FIG. 4 illustrates a flag represented by bits in the Length field used for indicating a station to be queried according to an embodiment.

One of the Reserved Subelement IDs 311, 315, 319 may be used to query proximate APs 340. The name 320 of the Reserved Subelement IDs 311, 315, 319 may be changed to Location of Proximate AP 342. The Length field (in octets) 330 may have a value 344 of 61 and the Extensible field 340 may indicate with a value of Yes 346. When the Extensible field 340 for the Location of Proximate AP 342 is set to YES 346, the length 344 indicated in the Length field 330 may be extended. The 61 octets 344 for the Length field 330 represents 488 bits FIG. 4 illustrates a flag represented by bits in the Length field 400 used for indicating a station to be queried 400 according to an embodiment. In FIG. 4, the flag has a BSSID Array field 410 (BSSID=6×UINT8, Max Length=10), an AP list indication flag field 420 and a reserved field 430. The BSSID Array field 410 may use 480 bits 412 to identify APs being queried. The AP list indication flag field 420 is 1 bit in length 422 to indicate whether a list of APs is being provided. The reserved field 430 is 7 bits in length 432. When request includes a flag 420 to indicate a station query for specific APs as indicated by the APs BSSID Array field 410, the request is issued. If no specific APs are indicated in the BSSID Array field 410, the AP that is sent the request will send a report regarding proximate APs per its discretion.

Figure 5:
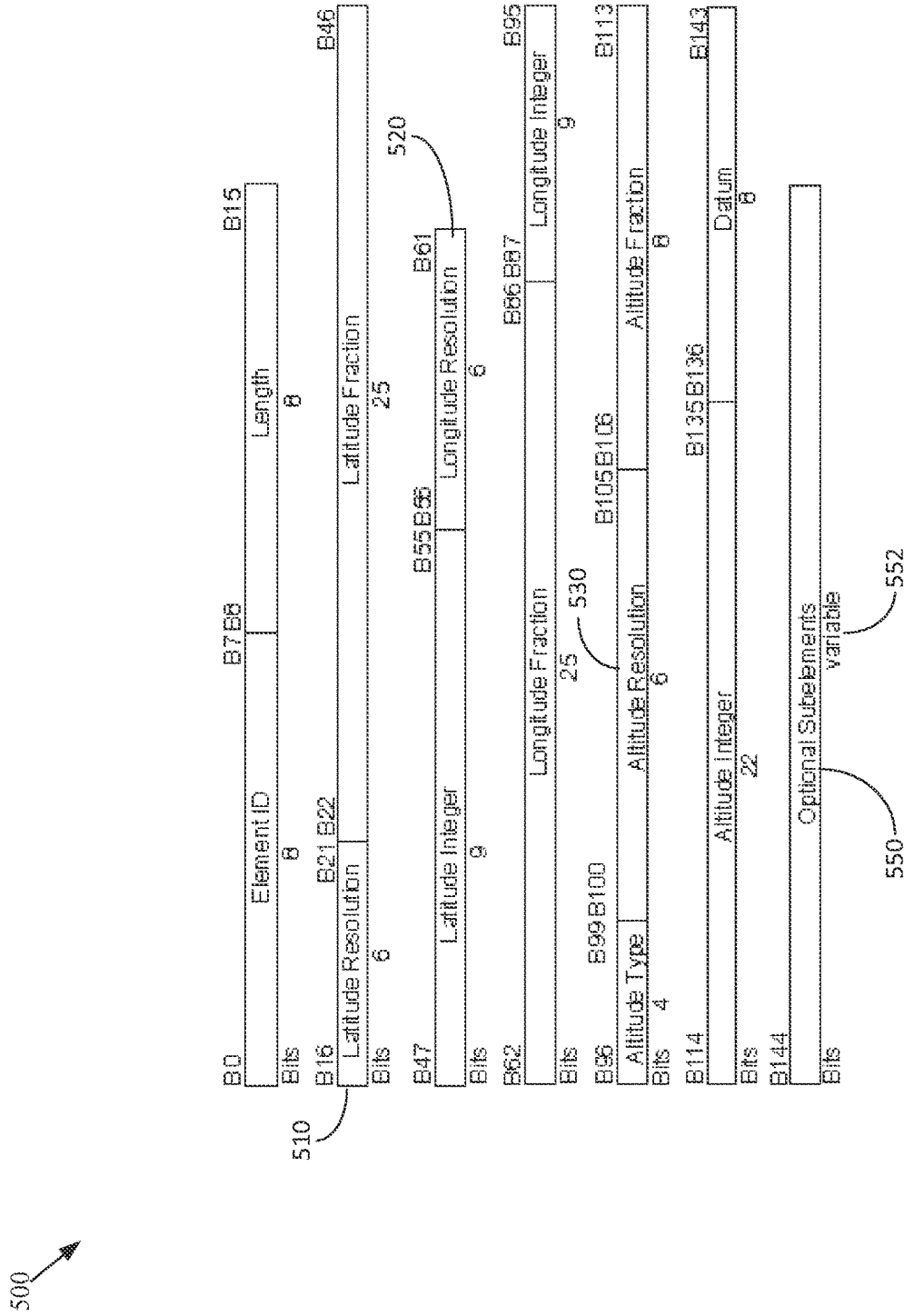
FIG. 5 illustrates a LCI report according to an embodiment.

FIG. 5 illustrates a LCI report 500 according to an embodiment. As shown in FIG. 5, an LCI Report 500 includes Latitude 510, Longitude 520, and Altitude 530 information. The lengths of each field, e.g., Latitude 510, Longitude 520, and Altitude 530 fields, are shown with defined lengths. However, the defined lengths may change without departing from the scope of the embodiments.

The Optional Subelements 550 may include multiple frames for sending the location information for each proximate AP, and may also provide additional information, e.g., ToF Support, floor text, etc. Accordingly, separate frames may be sent for each AP. The length of the Optional Subelements is variable 552. The Optional Subelements field 550 may include Subelement IDs, including Reserved Subelement IDs as shown in FIG. 3. Accordingly, Reserved Subelement IDs may be used to report location information for proximate APs.

Thus, the LCI report 500 is enhanced to include the proximate APs' BSSID, optional information elements, such as the height of an AP above a floor and floor text indicating a floor level of an AP, e.g.: 1, 2, basement, etc. associated with reporting (associated) AP and proximate APs, and LCI information for proximate APs, including AP Latitude, Longitude, Altitude, datum, and Optional Subelements for each Proximate AP.

Figure 6:
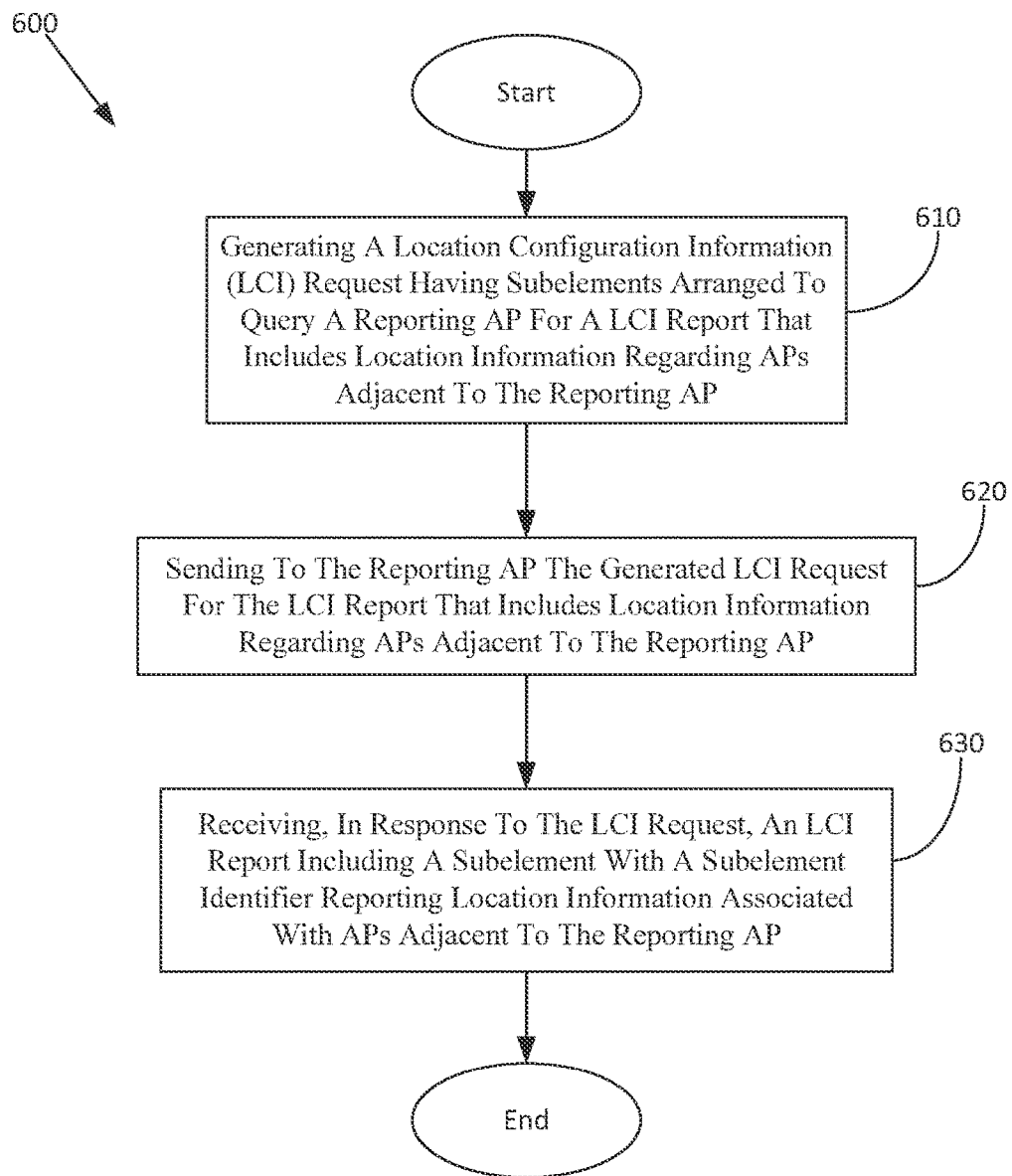
FIG. 6 is a flowchart of a method for providing a query for location information for access points (APs) proximate to a reporting AP according to an embodiment.

FIG. 6 is a flowchart 600 of a method for providing a query for location information for access points (APs) proximate to a reporting AP according to an embodiment. In FIG. 6, A Location Configuration Information (LCI) request having subelements arranged to query a reporting AP for a LCI report is generated that includes location information regarding APs proximate to the reporting AP 610. The generated LCI request for the LCI report that includes location information regarding APs proximate to the reporting AP is sent to the reporting AP 620. In response to the LCI request, an LCI report is received including a subelement with a subelement identifier reporting location information associated with APs proximate to the reporting AP 630.

Figure 7:
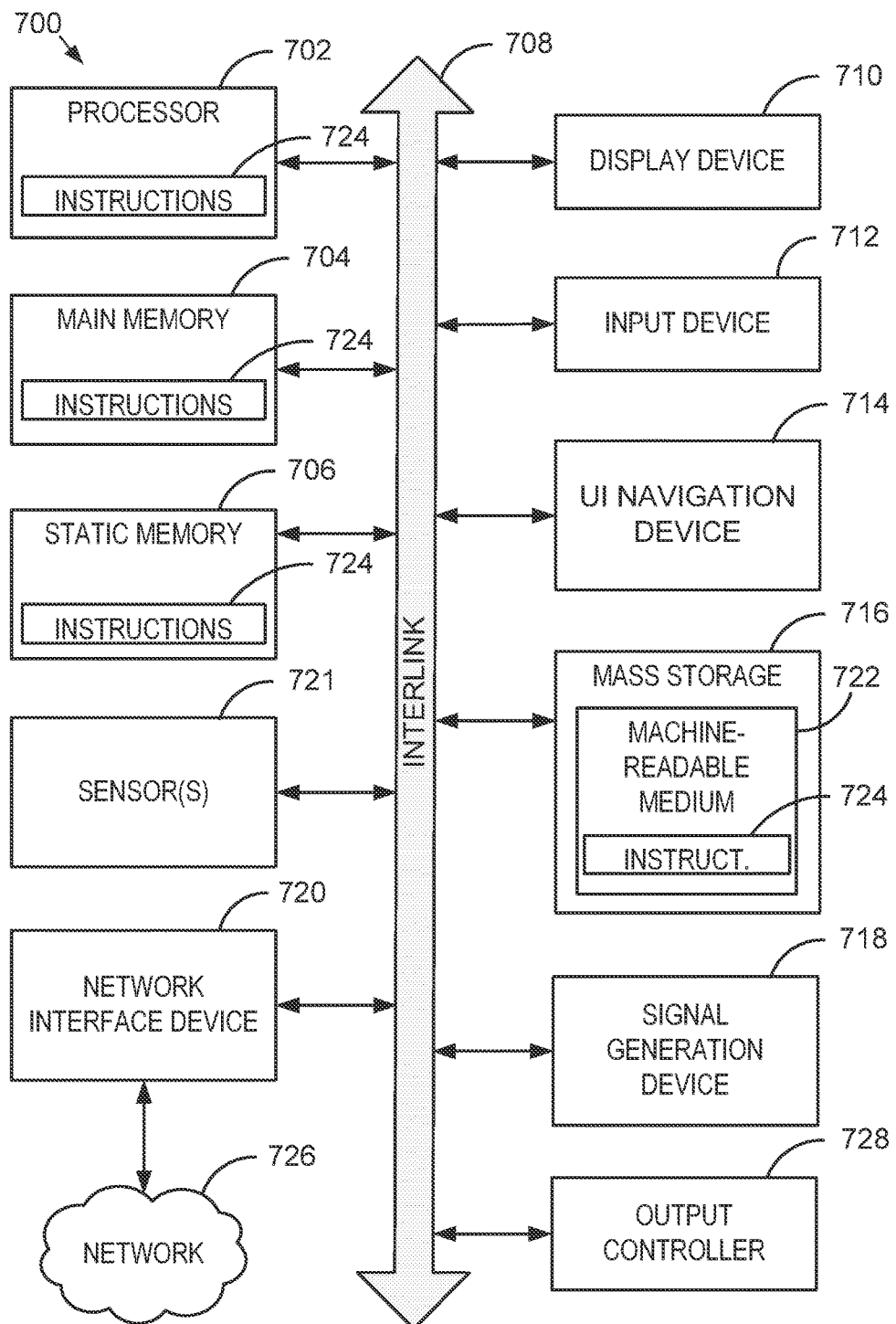
FIG. 7 illustrates a block diagram of an example machine for providing a query for location information for access points (APs) proximate to a reporting AP according to an embodiment

FIG. 7 illustrates a block diagram of an example machine 700 for providing a query for location information for access points (APs) proximate to a reporting AP according to an embodiment upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine and/or a client machine in server-client network environments. In an example, the machine 700 may act as a peer machine in peer-to-peer (P2P) (or other distributed) network environment. The machine 700 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 702 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 702 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 700 may include a hardware processor 702 (e.g., a central processing unit (CPU), a graphics processing unit (GPU), a hardware processor core, or any combination thereof), a main memory 704 and a static memory 706, at least some of which may communicate with others via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR)) connection to communicate or control one or more peripheral devices (e.g., a printer, card reader, etc.).

The storage device 716 may include at least one machine readable medium 722 on which is stored one or more sets of data structures or instructions 724 (e.g., software) embodying or utilized by any one or more of the techniques or functions described herein. The instructions 724 may also reside, at least partially, additional machine readable memories such as main memory 704, static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) that configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, interact protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA). Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

ADDITIONAL NOTES & EXAMPLES

Example 1 may include subject matter such as a method or means for performing acts) including generating a Location Configuration Information (LCD request having subelements arranged to query a reporting AP for a LCI report that includes location information regarding APs proximate to the reporting AP; and sending to the reporting AP the generated LCI request for the LCI report that includes location information regarding APs proximate to the reporting AP.

Example 2 may optionally include the subject matter of Example 1, wherein the generating the LCI request having subelements comprises generating the LCI request having a subelement with a subelement identifier identifying the LCI request as a request for the LCI report that includes location information regarding APs proximate to the reporting AP.

Example 3 may optionally include the subject matter of any one or more of Examples 1-2, wherein the generating the LCI request having a subelement with a subelement identifier further comprises generating the LCI request having a subelement with an indicator flag for denoting whether a list of proximate APs to include location information in the LCI report.

Example 4 may optionally include the subject matter of any one or more of Examples 1-3, wherein generating the LCI request having a subelement with an indicator flag for denoting whether a list of proximate APs to include location information in the LCI report comprises generating the LCI request having a subelement with a list of basic service set identifier (BSSID) associated with proximate APs to include location information in the LCI report.

Example 5 may optionally include the subject matter of any one or more of Examples 1-4, wherein generating the LCI request having a subelement with an indicator flag for denoting whether a list of proximate APs to include location information in the LCI report comprises generating the LCI request having a subelement without a list of BSSIDs to allow the reporting AP to decide what location information for proximate APs to include.

Example 6 may optionally include the subject matter of any one or more of Examples 1-5, wherein the generating the LCI request having subelements comprises generating the LCI request by using reserved subelements identifiers to identify the LCI request as a request for the LCI report that includes location information regarding APs proximate to the reporting AP.

Example 7 may optionally include the subject matter of any one or more of Examples 1-6, wherein the generating the LCI request having a subelement with a subelement identifier identifying the LCI request as a request for the LCI report that includes location information regarding APs proximate to the reporting AP comprises generating the LCI request having a subelement with a subelement identifier identifying the LCI request as a request for the LCI report that includes latitude, longitude and altitude information regarding APs proximate to the reporting AP.

Example 8 may optionally include the subject matter of any one or more of Examples 1-7, further comprising receiving, in response to the LCI request, an LCI report including a subelement with a subelement identifier reporting location information associated with APs proximate to the reporting AP.

Example 9 may optionally include the subject matter of any one or more of Examples 1-8, wherein the receiving the LCI report including a subelement with a subelement identifier reporting location information associated with APs proximate to the reporting AP comprises receiving the LCI report including a frame for each AP proximate to the reporting AP, the frames for each AP proximate to the reporting AP including a subelement with a subelement identifier arranged to report latitude, longitude and altitude information regarding APs proximate to the reporting AP.

Example 10 may optionally include the subject matter of any one or more of Examples 1-9, wherein the receiving the LCI report including a frame for each AP proximate to the reporting AP further comprises receiving the LCI report including a frame for each AP proximate to the reporting AP, the frames for each AP proximate to the reporting AP further including a subelement with a subelement identifier arranged to report a height above a floor and/or a floor text indicating a floor level associated with of each AP proximate to the reporting AP.

Example 11 may include subject matter (such as a device, apparatus, client or system) including a processor arranged to generate a Location Configuration Information (LCI) request having subelements arranged to query a reporting AP for a LCI report that includes location information regarding APs proximate to the reporting AP; and a transceiver, coupled to the processor, the transceiver being arranged to send to the reporting AP the generated LCI request for the LCI report that includes location information regarding APs proximate to the reporting AP.

Example 12 may optionally include the subject matter of Example 11, wherein the processor generates the LCI request having a subelement with a subelement identifier identifying the LCI request as a request for the LCI report that includes location information regarding APs proximate to the reporting AP.

Example 13 may optionally include the subject matter of any one or more of Examples 11-12, wherein the processor generates the LCI request having a subelement with an indicator flag for denoting whether a list of proximate APs to include location information in the LCI report.

Example 14 may optionally include the subject matter of any one or more of Examples 11-13, wherein processor generates the LCI request having a subelement with a list of BSSIDs associated with proximate APs to include location information in the LCI report.

Example 15 may optionally include the subject matter of any one or more of Examples 11-14, wherein processor generates the LCI request having a subelement without a list of BSSIDs to allow the reporting AP to decide what location information for proximate APs ton include.

Example 16 may optionally include the subject matter of any one or more of Examples 11-15, wherein the processor generates the LCI request by using reserved subelements identifiers to identify the LCI request as a request for the LCI report that includes location information regarding APs proximate to the reporting AP.

Example 17 may optionally include the subject matter of any one or more of Examples 11-16, wherein the processor generates the LCI request that includes a request for the LCI report that includes latitude, longitude and altitude information regarding APs proximate to the reporting AP.

Example 18 may optionally include the subject matter of any one or more of Examples 11-17, wherein the transceiver is further arranged to receive, in response to the LCI request, an LCI report including a frame for each AP proximate to the reporting AP.

Example 19 may optionally include the subject matter of any one or more of Examples 11-18, wherein the frames for each AP provided in the LCI report includes a subelement with a subelement identifier reporting latitude, longitude and altitude information regarding APs proximate to the reporting AP.

Example 20 may optionally include the subject matter of any one or more of Examples 11-19, wherein the frames for each AP provided in the LCI report includes a subelement with a subelement identifier reporting a height above a floor and/or a floor text indicating a floor level associated with of each AP proximate to the reporting AP.

Example 21 may include subject matter (such as means for performing acts or machine readable medium including instructions that, when executed by the machine, cause the machine to perform acts) including generating a Location Configuration Information (LCI) request having subelements arranged to query a reporting AP for a LCI report that includes location information regarding APs proximate to the reporting AP; and
  sending to the reporting AP the generated LCI request for the LCI report that includes location information regarding APs proximate to the reporting AP.

Example 22 may optionally include the subject matter of Example 21, wherein the generating the LCI request having subelements comprises generating the LCI request having a subelement with a subelement identifier identifying the LCI request as a request for the LCI report that includes location information regarding APs proximate to the reporting AP.

Example 23 may optionally include the subject matter of any one or more of Examples 21-22, wherein the generating the LCI request having a subelement with a subelement identifier further comprises generating the LCI request having a subelement with an indicator flag for denoting whether a list of proximate APs to include location information in the LCI report.

Example 24 may optionally include the subject matter of any one or more of Examples 21-23, wherein generating the LCI request having a subelement with an indicator flag for denoting whether a list of proximate APs to include location information in the LCI report comprises generating the LCI request having a subelement with a list of BSSIDs associated with proximate APs to include location information in the LCI report.

Example 25 may optionally include the subject matter of any one or more of Examples 21-24, wherein generating the LCI request having a subelement with an indicator flag for denoting whether a list of proximate APs to include location information in the LCI report comprises generating the LCI request having a subelement without a list of BSSIDs to allow the reporting AP to decide what location information for proximate APs ton include.

Example 26 may optionally include the subject matter of any one or more of Examples 21-25, wherein the generating the LCI request having subelements comprises generating the LCI request by using reserved subelements identifiers to identify the LCI request as a request for the LCI report that includes location information regarding APs proximate to the reporting AP.

Example 27 may optionally include the subject matter of any one or more of Examples 21-26, wherein the generating the LCI request having a subelement with a subelement identifier identifying the LCI request as a request for the LCI report that includes location information regarding APs proximate to the reporting AP comprises generating the LCI request having a subelement with a subelement identifier identifying the LCI request as a request for the LCI report that includes latitude, longitude and altitude information regarding APs proximate to the reporting AP.

Example 28 may optionally include the subject matter of any one or more of Examples 21-27, further comprising receiving, in response to the LCI request, an LCI report including a subelement with a subelement identifier reporting location information associated with APs proximate to the reporting; AP.

Example 29 may optionally include the subject matter of any one or more of Examples 21-28, wherein the receiving the LCI report including a subelement with a subelement identifier reporting location information associated with APs proximate to the reporting AP comprises receiving the LCI report including a frame for each AP proximate to the reporting AP, the frames for each AP proximate to the reporting AP including a subelement with a subelement identifier arranged to report latitude, longitude and altitude information regarding APs proximate to the reporting AP.

Example 30 may optionally include the subject matter of any one or more of Examples 21-29, wherein the receiving the LCI report including a frame for each AP proximate to the reporting AP further comprises receiving the LCI report including a frame for each AP proximate to the reporting AP, the frames for each AP proximate to the reporting AP further including a subelement with a subelement identifier arranged to report a height above a floor and/or a floor text indicating a floor level associated with of each AP proximate to the reporting AP.

Example 31 may include subject matter (such as a device, apparatus, client or system) including receiving, at a reporting AP from a requesting device, a Location Configuration Information (LCI) request having subelements arranged to request a LCI report that includes location information regarding APs proximate to the reporting AP;
  obtaining location information regarding APs proximate to the reporting AP for inclusion in the LCI report; and
  sending the LCI report including the location information regarding APs proximate to the reporting AP to the requesting device.

Example 32 may optionally include the subject matter of Example 31, wherein the receiving the LCI request includes receiving the LCI request having a subelement with a subelement identifier identifying the LCI request as a request for the LCI report that includes location information regarding APs proximate to the reporting AP.

Example 33 may optionally include the subject matter of any one or more of Examples 31-32, wherein the receiving the LCI request includes receiving the LCI request having a subelement with an indicator flag for denoting whether a list of proximate APs to include location information in the LCI report.

Example 34 may optionally include the subject matter of any one or more of Examples 31-33, wherein the receiving the LCI request includes receiving the LCI request having a subelement with a list of basic service set identifier (BSSID) associated with proximate APs to include location information in the LCI report.

Example 35 may optionally include the subject matter of any one or more of Examples 31-34, wherein the receiving the LCI request includes receiving the LCI request having a subelement without a list of BSSIDs to allow the reporting AP to decide what location information for proximate APs to include.

Example 36 may optionally include the subject matter of any one or more of Examples 31-35, wherein the receiving the LCI request includes receiving the LCI request having reserved subelements identifiers to identify the LCI request as a request for the LCI report that includes location information regarding APs proximate to the reporting AP.

Example 37 may optionally include the subject matter of any one or more of Examples 31-36, wherein the receiving the LCI request includes receiving the LCI request having a subelement with a subelement identifier identifying the LCI request as a request for the LCI report that includes latitude, longitude and altitude information regarding APs proximate to the reporting AP.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are subelementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus comprising a memory and a processor configured to cause a first wireless station to:

process a Location Configuration Information (LCI) request from a second wireless station, the LCI request comprising a field comprising a Medium Access Control (MAC) address of a third wireless station, and a field to indicate a location request for the third wireless station; and transmit an LCI report to the second wireless station, the LCI report comprising location information corresponding to the third wireless station, the LCI report comprising floor information of a floor level of the third wireless station, and height above floor information indicating a height of the third wireless station above the floor.

2. The apparatus of claim 1, wherein the field comprising the MAC address of the third wireless station is in an optional subelements field.

3. The apparatus of claim 1, wherein the LCI request comprises a location subject field having a size of one octet.

4. The apparatus of claim 1, wherein the LCI request comprises a requested resolution field to indicate a requested resolution of a parameter in the LCI report.

5. The apparatus of claim 1, wherein the LCI request comprises an azimuth request field.

6. The apparatus of claim 1, wherein the LCI report comprises latitude, longitude and altitude information corresponding to the third wireless station.

7. The apparatus of claim 1, wherein the LCI report comprises the MAC address of the third wireless station.

8. The apparatus of claim 1 comprising a radio to receive the LCI request, and to transmit the LCI report.

9. The apparatus of claim 1 comprising one or more antennas.

10. A product comprising one or more tangible computer-readable non-transitory storage media comprising computer-executable instructions operable to, when executed by at least one processor, enable the at least one processor to cause a first wireless station to:

process a Location Configuration Information (LCI) request from a second wireless station, the LCI request comprising a field comprising a Medium Access Control (MAC) address of a third wireless station, and a field to indicate a location request for the third wireless station; and transmit an LCI report to the second wireless station, the LCI report comprising location information corresponding to the third wireless station, the LCI report comprising floor information of a floor level of the third wireless station, and height above floor information indicating a height of the third wireless station above the floor.

11. The product of claim 10, wherein the field comprising the MAC address of the third wireless station is in an optional subelements field.

12. The product of claim 10, wherein the LCI request comprises a location subject field having a size of one octet.

13. The product of claim 10, wherein the LCI request comprises a requested resolution field to indicate a requested resolution of a parameter in the LCI report.

14. The product of claim 10, wherein the LCI request comprises an azimuth request field.

15. The product of claim 10, wherein the LCI report comprises latitude, longitude and altitude information corresponding to the third wireless station.

16. The product of claim 10, wherein the LCI report comprises the MAC address of the third wireless station.

17. An apparatus comprising a memory and a processor configured to cause a first wireless station to:
   transmit a Location Configuration Information (LCI) request to a second wireless station, the LCI request comprising a field comprising a Medium Access Control (MAC) address of a third wireless station, and a field to indicate a location request for the third wireless station; and
   process an LCI report from the second wireless station, the LCI report comprising location information corresponding to the third wireless station, the LCI report comprising floor information of a floor level of the third wireless station, and height above floor information indicating a height of the third wireless station above the floor.

18. The apparatus of claim 17, wherein the field comprising the MAC address of the third wireless station is in an optional subelements field.

19. The apparatus of claim 17, wherein the LCI request comprises a location subject field having a size of one octet.

20. The apparatus of claim 17, wherein the LCI request comprises a requested resolution field to indicate a requested resolution of a parameter in the LCI report.

21. The apparatus of claim 17, wherein the LCI request comprises an azimuth request field.

22. The apparatus of claim 17, wherein the LCI report comprises latitude, longitude and altitude information corresponding to the third wireless station.

23. The apparatus of claim 17, wherein the LCI report comprises the MAC address of the third wireless station.

24. The apparatus of claim 17 configured to cause the first wireless station to perform a Round Trip Time (RTT) measurement with the third wireless station.

25. The apparatus of claim 17 comprising a radio to transmit the LCI request, and to receive the LCI report.

26. The apparatus of claim 17 comprising one or more antennas.

27. A product comprising one or more tangible computer-readable non-transitory storage media comprising computer-executable instructions operable to, when executed by at least one processor, enable the at least one processor to cause a first wireless station to:
   transmit a Location Configuration Information (LCI) request to a second wireless station, the LCI request comprising a field comprising a Medium Access Control (MAC) address of a third wireless station, and a field to indicate a location request for the third wireless station; and
   process an LCI report from the second wireless station, the LCI report comprising location information corresponding to the third wireless station, the LCI report comprising floor information of a floor level of the third wireless station, and height above floor information indicating a height of the third wireless station above the floor.

28. The product of claim 27, wherein the field comprising the MAC address of the third wireless station is in an optional subelements field.

29. The product of claim 27, wherein the LCI request comprises a location subject field having a size of one octet.

30. The product of claim 27, wherein the LCI request comprises a requested resolution field to indicate a requested resolution of a parameter in the LCI report.

31. The product of claim 27, wherein the LCI request comprises an azimuth request field.

32. The product of claim 27, wherein the LCI report comprises latitude, longitude and altitude information corresponding to the third wireless station.

33. The product of claim 27, wherein the LCI report comprises the MAC address of the third wireless station.

34. The product of claim 27, wherein the instructions are operable to, when executed by the at least one processor, enable the at least one processor to cause the first wireless station to perform a Round Trip Time (RTT) measurement with the third wireless station.

* * * * *